United States Patent
Fetzer et al.

(10) Patent No.: US 9,933,210 B2
(45) Date of Patent: Apr. 3, 2018

(54) EXHAUST GAS COOLER

(71) Applicant: Mahle International GmbH, Stuttgart (DE)

(72) Inventors: Tobias Fetzer, Ostfildern (DE); Steffen Groezinger, Vaihingen (DE); David Kenntner, Leinfelden-Echterdingen (DE); Boris Kerler, Stuttgart (DE); Alexander Meiser, Stuttgart (DE); Martin Paarmann, Stuttgart (DE); Thomas Seeger, Leinfelden-Echterdingen (DE); Voker Velte, Oetisheim (DE)

(73) Assignee: Mahle International GmbH (DE)

( * ) Notice: Subject to any disclaimer, the term of this patent is extended or adjusted under 35 U.S.C. 154(b) by 160 days.

(21) Appl. No.: 14/779,636

(22) PCT Filed: Mar. 12, 2014

(86) PCT No.: PCT/EP2014/054868
§ 371 (c)(1),
(2) Date: Sep. 24, 2015

(87) PCT Pub. No.: WO2014/154489
PCT Pub. Date: Oct. 2, 2014

(65) Prior Publication Data
US 2016/0054066 A1 Feb. 25, 2016

(30) Foreign Application Priority Data
Mar. 25, 2013 (DE) .......... 10 2013 205 242

(51) Int. Cl.
F28D 1/03 (2006.01)
F28D 9/00 (2006.01)
(Continued)

(52) U.S. Cl.
CPC .......... F28D 1/03 (2013.01); F01N 3/0205 (2013.01); F28D 9/005 (2013.01);
(Continued)

(58) Field of Classification Search
CPC ...... F28D 9/005; F28D 21/0003; F28F 3/086; F28F 2215/04
(Continued)

(56) References Cited

U.S. PATENT DOCUMENTS

| 4,049,051 A * | 9/1977 | Parker ............... F28F 3/027 165/146 |
| 6,170,568 B1 * | 1/2001 | Valenzuela ......... F28D 9/0012 165/166 |

(Continued)

FOREIGN PATENT DOCUMENTS

| DE | 102006049106 A1 | 6/2007 |
| DE | 102008014375 A1 | 9/2009 |

(Continued)

OTHER PUBLICATIONS

German Search Report for DE-102013205242.1, dated Nov. 20, 2013.
(Continued)

*Primary Examiner* — Orlando E Aviles Bosques
*Assistant Examiner* — For K Ling
(74) *Attorney, Agent, or Firm* — Fishman Stewart PLLC

(57) ABSTRACT

An exhaust gas cooler may include a plurality of stacked disc pairs. A first flow chamber for a coolant flow may be disposed between two discs of at least a first disc pair of the plurality of disc pairs. A second flow chamber for an exhaust gas flow may be disposed between two second disc pairs of the plurality of disc pairs arranged mutually adjacent with respect to one another. The plurality of stacked disc pairs may include at least one coolant inlet and at least one coolant (Continued)

outlet. The first disc pair may include a plurality of coolant inlets and a plurality of coolant outlets surrounding an edge of the first disc pair to facilitate peripheral edge cooling.

20 Claims, 1 Drawing Sheet

(51) Int. Cl.
F28D 21/00 (2006.01)
F01N 3/02 (2006.01)
(52) U.S. Cl.
CPC .... F28D 21/0003 (2013.01); *F01N 2260/024* (2013.01); *Y02T 10/20* (2013.01)
(58) Field of Classification Search
USPC .......................................... 165/146, 165–167
See application file for complete search history.

(56) References Cited

U.S. PATENT DOCUMENTS

| | | | | |
|---|---|---|---|---|
| 6,318,456 B1* | 11/2001 | Brenner | ................ | F28D 9/0018 165/133 |
| 6,830,736 B1* | 12/2004 | Lamla | ................... | B01J 12/007 165/167 |
| 7,073,573 B2* | 7/2006 | Agee | .................... | F28D 9/0062 165/146 |
| 7,203,064 B2* | 4/2007 | Mongia | ................. | H01L 23/473 165/104.33 |
| 7,717,165 B2* | 5/2010 | Hendrix | ................. | F28D 9/005 165/167 |
| 8,020,612 B2* | 9/2011 | Wegner | ................... | F28D 9/005 165/166 |
| 2002/0000310 A1* | 1/2002 | Cheadle | ................ | F28D 9/0012 165/167 |
| 2005/0056411 A1* | 3/2005 | Dilley | ................... | F28D 9/0018 165/167 |
| 2008/0264619 A1* | 10/2008 | Velte | ...................... | F28D 9/005 165/167 |
| 2011/0120678 A1 | 5/2011 | Palm | | |
| 2013/0126137 A1 | 5/2013 | Velte | | |

FOREIGN PATENT DOCUMENTS

| | | |
|---|---|---|
| DE | 102008045845 A1 | 3/2010 |
| DE | 102009012493 A1 | 9/2010 |
| DE | 202009015586 U1 | 3/2011 |
| DE | 102010028660 A1 | 11/2011 |
| WO | WO-2007031230 A1 | 3/2007 |

OTHER PUBLICATIONS

English abstract for DE-102006049106.
English abstract for DE-102008045845.
English abstract for DE-102009012493.
English abstract for DE-102008014375.

\* cited by examiner

EXHAUST GAS COOLER

CROSS-REFERENCE TO RELATED APPLICATIONS

This application claims priority to German Patent Application No. 10 2013 205 242.1, filed Mar. 25, 2013, and International Patent Application No. PCT/EP2014/054868, filed Mar. 12, 2014, both of which are hereby incorporated by reference in their entirety.

TECHNICAL FIELD

The present invention relates to an exhaust gas cooler with disc pairs stacked on one another in a stacking direction.

BACKGROUND

From DE 10 2009 012 493 A1 a generic exhaust gas cooler having stacked disc pairs is known, wherein a first flow chamber through which coolant can flow is formed between two discs of at least one first disc pair or of multiple first disc pairs, and wherein a second flow chamber through which exhaust gas can flow is formed between two mutually adjacent second disc pairs. Furthermore, in addition a coolant inlet and a coolant outlet and an inlet and an outlet are provided for the gas which is to be cooled. A first flow path, which is formed at least in certain areas by etching at least of one surface of a disc of a disc pair, leads here through the first flow chamber. By the etching, optimized flow path geometries are to be able to be produced in a simple manner.

A disadvantage in all the exhaust gas coolers known from the prior art are their comparatively high temperature thermal stresses on an outer side, which lead there to high temperature expansions and hence to a great load.

SUMMARY

The present invention is therefore concerned with the problem of indicating for an exhaust gas cooler of the generic type an improved or at least an alternative embodiment, which is distinguished in particular by lower thermal stresses.

This problem is solved according to the invention by the subject of the independent claim. Advantageous embodiments are the subject of the dependent claims.

The present invention is based on the general idea of additionally cooling an exhaust gas cooler precisely in the region in which the highest thermal stresses are to be expected. These regions are to be seen in particular in a circumferential edge of the exhaust gas cooler. For this reason, multiple coolant inlets and multiple coolant outlets are arranged around the edge of individual disc pairs which form the exhaust gas cooler in a stacked manner, and thereby allow all-round edge cooling of the exhaust gas cooler and a stress reduction in this region. Through the stress reduction, the load acting on the exhaust gas cooler can be reduced and thereby its service life can be increased. The individual disc pairs are stacked on one another here in a stacking direction, wherein a first flow chamber through which coolant can flow is formed between two discs of at least one first disc pair or of multiple first disc pairs, and wherein a second flow chamber through which exhaust gas can flow is formed between two mutually adjacent second disc pairs. Furthermore, the exhaust gas cooler of course has an inlet and an outlet for the exhaust gas which is to be cooled. Through the provision according to the invention of the coolant inlets or respectively coolant outlets at the edge of a respective disc pair, in particular high temperature differences within the exhaust gas cooler can be compensated and thereby the stress load for the exhaust gas cooler can be reduced.

Expediently, the individual discs have the form of two circular arcs with straight lines connecting these. Such a shape is also to be found for example in a cinder track in a stadium and constitutes the usual shape for exhaust gas coolers. In the case of such an elongated oval, in particular corners are avoided, which can lead to stress peaks and hence to load peaks.

In a further advantageous embodiment of the solution according to the invention, an exhaust gas inlet and an exhaust gas outlet are arranged in a semicircular-shaped manner in the circular arcs of the discs and are additionally surrounded by coolant inlets or respectively coolant outlets. Hereby, also in the region of the exhaust gas inlet and of the exhaust gas outlet a cooling around the edge of the discs of the exhaust gas cooler can be achieved and in this region the thermal stresses occurring there can be reduced.

The coolant inlets, just as the coolant outlets, have a cross-section in the manner of a flat tube with rounded corners, whereby an arrangement lying closely against the edge of the respective discs is made possible. It is conceivable here that the flat tube-like coolant inlets are arranged on one half of a respective disc and the flat tube-like coolant outlets are arranged on the other side. Through the rounded corners, in particular stress-critical pointed corners can be avoided, which likewise has a positive effect on the loading of the exhaust gas cooler.

In a further advantageous embodiment of the solution according to the invention, flow-directing elements are arranged between two adjacent discs, which together form a disc pair. These flow-directing elements are intended to improve the heat exchange and in particular to swirl the through-flowing coolant or respectively exhaust gas, which likewise assists the heat exchange. A different number of flow-directing elements can be arranged here between different disc pairs and namely decreasingly with increasing distance from an exhaust gas inlet connection of the exhaust gas cooler. Hereby, a homogenization of the through-flow behaviour can be achieved, because close to the exhaust gas inlet connection a comparatively high exhaust gas pressure prevails, which decreases at an increasing distance. At an increasing distance, the number of the flow-directing elements arranged between the individual disc pairs also decreases, whereby the flow resistance is reduced. In the most favourable case, homogeneous flow conditions can be achieved here in the entire exhaust gas cooler.

Expediently, chamfers are arranged in the corner regions of the semicircular-shaped exhaust gas inlet and exhaust gas outlet. Such chamfers improve an inflow- or respectively outflow behaviour and thereby reduce the flow resistance within the exhaust gas cooler both in the region of the exhaust gas and also in the region of the coolant. Likewise, a nose on a straight line of the semicircular-shaped exhaust gas inlet or respectively exhaust gas outlet can favourably influence the flow behaviour, so that this can also be utilized for the improved flow guidance.

Further important features and advantages of the invention will emerge from the subclaims, from the drawings and from the associated figure description with the aid of the drawings.

It shall be understood that the features named above and to be explained further below are able to be used not only in the respectively indicated combination, but also in other combinations or in isolation, without departing from the scope of the present invention.

Preferred example embodiments of the invention are illustrated in the drawings and are explained in further detail in the following description, wherein the same reference numbers refer to identical or similar or functionally identical components.

BRIEF DESCRIPTION OF THE DRAWINGS

There are shown here, respectively diagrammatically.

DETAILED DESCRIPTION

Figure 1:
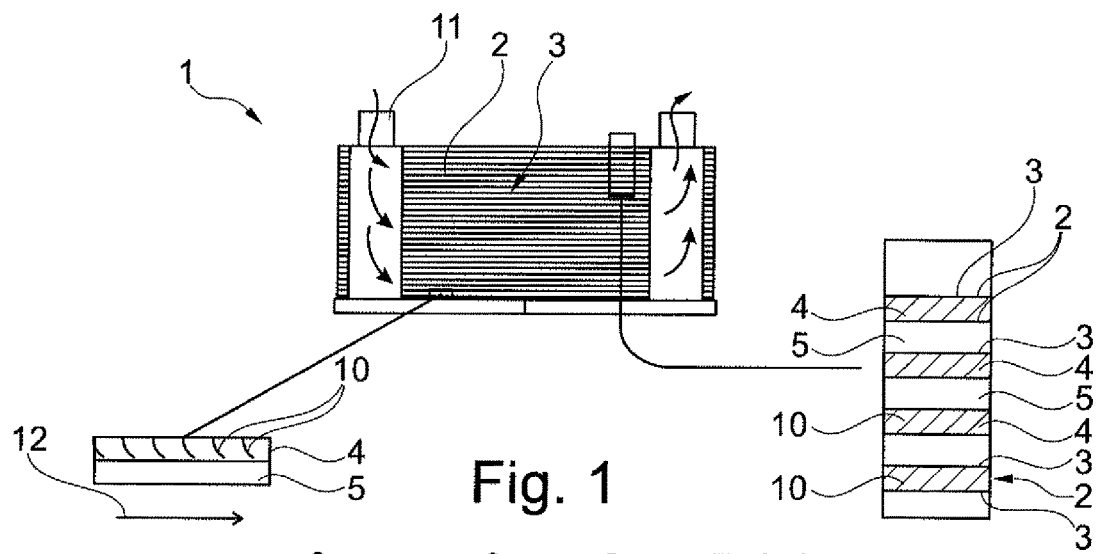
FIG. 1 a sectional illustration through an exhaust gas cooler according to the invention, with two detail illustrations, FIG. 2 a view from above onto a disc of the exhaust gas cooler according to the invention, FIG. 3 discs, partially in section, of such an exhaust gas cooler.

According to FIG. 1, an exhaust gas cooler 1 according to the invention has disc pairs 2 stacked on one another, wherein a first flow chamber 4 through which coolant can flow is formed between two discs 3 of at least one first disc pair 2 or of multiple first disc pairs 2, and wherein a second flow chamber 5 through which exhaust gas can flow is formed between two mutually adjacent second disc pairs 2. A coolant inlet 6 and a coolant outlet 7 and an exhaust gas inlet 8 and an exhaust gas outlet 9 are likewise provided (cf. FIGS. 2 and 3). It is now essential to the invention here that each first disc pair 2 has multiple coolant inlets 6 and multiple coolant outlets 7 disposed around the edge of the respective disc pair 2 to allow all-round edge cooling of the exhaust gas cooler 1, connected with the stress reduction involved therewith. The coolant inlets 6 and the coolant outlets 7 are to be seen particularly clearly here in the illustrations according to FIGS. 2 and 3.

Figure 2:
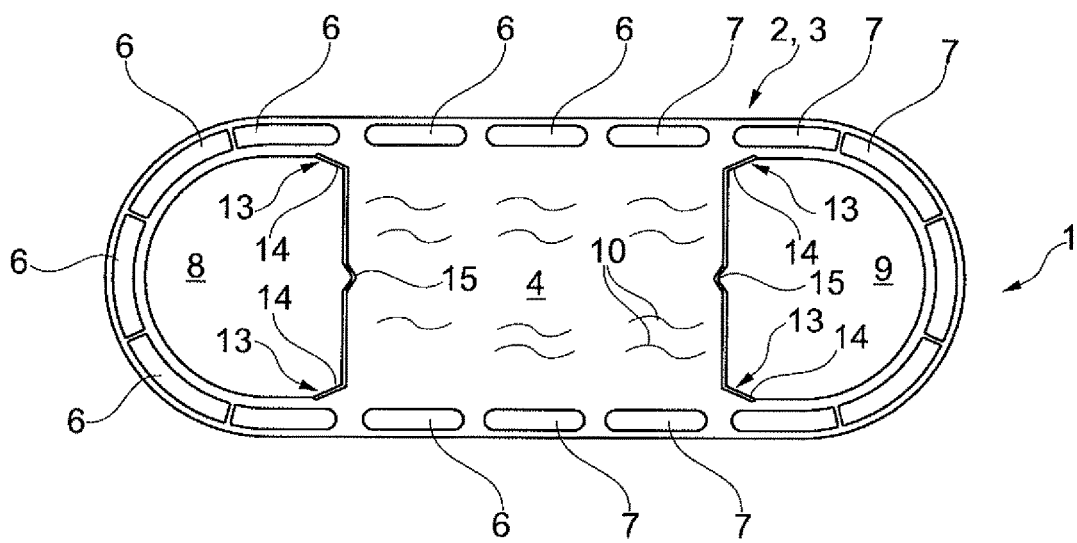
Figure 3:
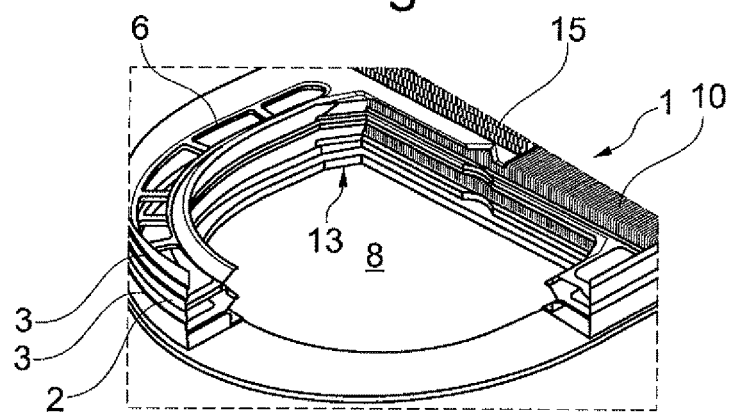

The individual discs 3 have here the shape of two circular arcs with straight lines connecting these, as can be clearly seen according to FIG. 2. The exhaust gas inlet 8 and the exhaust gas outlet 9 are arranged here in the respective circular arcs. The coolant inlets 6 are arranged here surrounding the exhaust gas inlet 8, whereas the coolant outlets 7 are arranged surrounding the exhaust gas outlet 9. Of course, a reverse arrangement is also conceivable, i.e. the coolant inlets 6 are arranged surrounding the exhaust gas outlet 9, whereas the coolant outlets 7 are arranged surrounding the exhaust inlet 8. Observing FIG. 2, it can be seen that the coolant inlets 6 and the coolant outlets 7 have a cross-section in the manner of a flat tube with rounded corners, which is favourable in particular with regard to stress, because sharp corners and edges can always bring about stress peaks.

Observing FIG. 1, it can be seen that a different number of flow-directing elements 10 is arranged between different discs 3, and namely decreasingly with increasing distance from an exhaust gas inlet connection 11 of the exhaust cooler 1. This means that in the upper disc pairs 2 of the exhaust gas cooler 1 more flow-directing elements 10 are arranged and increasingly fewer below. Hereby, a homogeneous pressure distribution or respectively a homogeneous flow behaviour can be enforced within the exhaust gas cooler 1, because also the pressure of the inflowing exhaust gas decreases with a distance from the exhaust gas inlet connection 11. In the same manner, a number of flow-directing elements 10 between two discs 3 can increase in flow direction 12, as can likewise be seen from a detail illustration of FIG. 1. The flow-directing elements 10 are drawn here exclusively in the first flow chamber 4, wherein it is of course also conceivable that such flow-directing elements 10 are arranged in the second flow chamber 5.

In order to improve a flow behaviour fluidically within the flow chamber 4, and in particular a flowing in or respectively out of the coolant, chamfers 14 are arranged in corner regions 13 of the semicircular-shaped exhaust gas inlet 8 or respectively exhaust gas outlet 9. Noses 15, which are arranged on the straight line of the semicircular-shaped exhaust gas inlet 8 or respectively exhaust gas outlet 9, likewise act in a fluidically favourable manner.

The flow-directing elements 10 can be embodied here according to the form illustrated in FIG. 1, wherein of course also any other forms are also conceivable, which swirl the flowing fluid, i.e. therefore for example the exhaust gas or the coolant, and thereby improve the heat transmission. It is particularly advantageous in the exhaust gas cooler 1 according to the invention that through the coolant inlets 6 arranged around the edge and the coolant outlets 7 arranged around the edge, temperature- and hence stress peaks are prevented in the edge region of the discs 3, which has a positive effect on the service life of the exhaust gas cooler 1.

The invention claimed is:

1. An exhaust gas cooler, comprising:
   a plurality of stacked disc pairs including a plurality of discs;
   a first flow chamber for a coolant flow disposed between two discs of at least a first disc pair of the plurality of disc pairs;
   a second flow chamber for an exhaust gas flow disposed between two second disc pairs of the plurality of disc pairs arranged mutually adjacent with respect to one another;
   the plurality of stacked disc pairs including at least one coolant inlet and at least one coolant outlet;
   the plurality of discs respectively having a shape of two circular arcs disposed at longitudinal ends and linear edges connecting the two circular arcs;
   an exhaust gas inlet disposed in one of the two circular arcs and an exhaust gas outlet disposed in another one of the two circular arcs of each of the plurality of discs, the exhaust gas inlet and the exhaust gas outlet defining a semi-circular shape;
   the first disc pair further including a plurality of coolant inlets and a plurality of coolant outlets disposed along an outer edge of the first disc pair to facilitate peripheral edge cooling;
   wherein at least some of the plurality of coolant inlets and the plurality of coolant outlets are arranged surrounding at least one of the exhaust gas inlet and the exhaust gas outlet, and at least some other of the plurality of coolant inlets and the plurality of coolant outlets define rows of coolant inlets and coolant outlets respectively arranged along each linear edge of each disc of the first disc pair;
   wherein the rows of coolant inlets and coolant outlets run in parallel to one another and along the linear edges of each disc of the first disc pair; and
   wherein the plurality of coolant inlets and the plurality of coolant outlets of the rows of coolant inlets and coolant outlets are spaced apart from one another and have a flat tubular cross-section with rounded corners.

2. The exhaust gas cooler according to claim 1, wherein the rows of coolant inlets and coolant outlets are each arranged along a respective one of the linear edges in each disc of the first disc pair between the exhaust gas inlet and the exhaust gas outlet defined at the two circular arcs.

3. The exhaust gas cooler according to claim 1, wherein the flat tubular cross-section of the plurality of coolant inlets and the plurality coolant outlets of the rows of coolant inlets and coolant outlets run in a longitudinal direction of each disc of the first disc pair.

4. The exhaust gas cooler according to claim 1, further comprising a plurality of flow-directing elements arranged in at least one of the first flow chamber and the second flow chamber.

5. The exhaust gas cooler according to claim 4, wherein the first flow chamber has a different number of the plurality of flow-directing elements than the second flow chamber.

6. The exhaust gas cooler according to claim 4, wherein a number of the plurality of flow-directing elements in the first flow chamber increases in a through-flow direction.

7. The exhaust gas cooler according to claim 6, wherein a number of the plurality of flow-directing elements in the second flow chamber increases in a through-flow direction.

8. The exhaust gas cooler according to claim 4, wherein a number of the plurality of flow-directing elements in the second flow chamber increases in a through-flow direction.

9. The exhaust gas cooler according to claim 1, further comprising at least one chamfer disposed in a corner region of at least one of the exhaust gas inlet and the exhaust gas outlet.

10. The exhaust gas cooler according to claim 1, wherein at least one of the exhaust gas inlet and the exhaust gas outlet of the plurality of discs has a nose provided on a straight line defined by the semi-circular shape for directing a fluid flow.

11. The exhaust gas cooler according to claim 10, wherein the nose has a cross-section open to the at least one of the exhaust gas inlet and the exhaust gas outlet to facilitate flow guidance.

12. The exhaust gas cooler according to claim 1, wherein the plurality of disc pairs includes a plurality of first disc pairs and a plurality of second disc pairs, and a plurality of first flow chambers are each disposed between two discs of the plurality of first disc pairs, and a plurality of second flow chambers are each disposed between two second disc pairs of the plurality of second disc pairs arranged mutual adjacent to one another.

13. The exhaust gas cooler according to claim 12, further comprising a plurality of flow-directing elements disposed in at least one of the plurality of first flow chambers and the plurality of second flow chambers.

14. The exhaust gas cooler according to claim 13, wherein at least one first flow chamber of the plurality of first flow chambers includes a different number of the plurality of flow-directing elements than another first flow chamber of the plurality of first flow chambers.

15. The exhaust gas cooler according to claim 13, wherein at least one first flow chamber of the plurality of first flow chambers disposed towards an exhaust gas inlet connection has a greater amount of the plurality of flow-directing elements in relation to another first flow chamber of the plurality of first flow chambers disposed away from the exhaust gas inlet connection.

16. The exhaust gas cooler according to claim 13, wherein at least one second flow chamber of the plurality of second flow chambers includes a different number of the plurality of flow-directing elements than another second flow chamber of the plurality of second flow chambers.

17. The exhaust gas cooler according to claim 13, wherein at least one second flow chamber of the plurality of second flow chambers disposed towards an exhaust gas inlet connection has a greater amount of the plurality of flow-directing elements in relation to another second flow chamber of the plurality of second flow chambers disposed away from the exhaust gas inlet connection.

18. The exhaust gas cooler according to claim 13, wherein a number of the plurality of flow-directing elements disposed in the plurality of first flow chambers increases in a through-flow direction.

19. The exhaust gas cooler according to claim 13, wherein a number of the plurality of flow-directing elements disposed in the plurality of second flow chambers increases in a through-flow direction.

20. The exhaust gas cooler according to claim 1, wherein the plurality of coolant inlets and the plurality of coolant outlets are structured as through-openings.

* * * * *